(12) United States Patent
Aoike (10) Patent No.: US 9,110,881 B2
(45) Date of Patent: Aug. 18, 2015

(54) CHARACTER INPUT DEVICE AND CHARACTER INPUT PROGRAM

(75) Inventor: Toru Aoike, Saitama (JP)

(73) Assignee: Motorola Mobility LLC, Chicago, IL (US)

( * ) Notice: Subject to any disclaimer, the term of this patent is extended or adjusted under 35 U.S.C. 154(b) by 862 days.

(21) Appl. No.: 13/383,381

(22) PCT Filed: Apr. 12, 2010

(86) PCT No.: PCT/JP2010/056514
§ 371 (c)(1),
(2), (4) Date: Jan. 10, 2012

(87) PCT Pub. No.: WO2011/007605
PCT Pub. Date: Jan. 20, 2011

(65) Prior Publication Data
US 2012/0113010 A1 May 10, 2012

(30) Foreign Application Priority Data
Jul. 17, 2009 (JP) .................................. 2009-168944

(51) Int. Cl.
*G06F 17/27* (2006.01)
(52) U.S. Cl.
CPC .................................. *G06F 17/276* (2013.01)
(58) Field of Classification Search
CPC . G06F 3/018; G06F 17/211; G06F 17/30867;
G06F 3/0233; G06F 17/21; G06F 17/2735;
G06F 17/2845; G06F 17/2863; G06F 3/0234;
G06F 15/02; G06F 15/17375; G06F 17/11;
G06F 17/215; G06F 17/2223; G06F 17/276;
G06F 17/30398; G06F 17/30401; G06F
17/30569; G06F 17/30864; G06F 17/30899;
G06F 19/322; G06F 3/0236; G06F 3/0237;
G06F 3/04886; G06F 3/167; G06F 8/51;
G06F 9/444
USPC ......................................................... 345/168
See application file for complete search history.

(56) References Cited

U.S. PATENT DOCUMENTS

| | | | | |
|---|---|---|---|---|
| 2002/0145587 A1* | 10/2002 | Watanabe | ...................... | 345/156 |
| 2003/0126166 A1* | 7/2003 | Good et al. | ..................... | 708/160 |
| 2012/0011152 A1* | 1/2012 | Gulwani et al. | ............... | 707/771 |

FOREIGN PATENT DOCUMENTS

| | | |
|---|---|---|
| CN | 1581103 A | 2/2005 |
| JP | 8-329165 A | 12/1906 |
| JP | 2-148358 A | 6/1990 |
| JP | 6-131337 A | 5/1994 |
| JP | 6-202995 A | 7/1994 |
| JP | 2002288495 A | 10/2002 |

(Continued)

OTHER PUBLICATIONS

Chinese Office Action for CN Application No. 201080032383.0 issued on Sep. 16, 2013 with English Translation.

(Continued)

*Primary Examiner* — Gerald Johnson (57) ABSTRACT

The object of the present invention is to provide a character input device that facilities the input of an added value in inputting text including numeric values. In a character input device that adopts a predictive conversion method, a preset mathematical operation is performed when a numeric value is inputted, and the result of the mathematical operation is displayed as a conversion candidate.

6 Claims, 7 Drawing Sheets

(56) References Cited

FOREIGN PATENT DOCUMENTS

| | | | |
|---|---|---|---|
| JP | 2005234742 | A | 9/2005 |
| JP | 2006127002 | A | 5/2006 |
| JP | 2009015743 | A | 1/2009 |

OTHER PUBLICATIONS

International Search Report for PCT/JP2010/056514 mailed May 11, 2010.

Japanese Office Action for JP2009-168944 mailed on Mar. 13, 2013.

* cited by examiner

CHARACTER INPUT DEVICE AND CHARACTER INPUT PROGRAM

TECHNICAL FIELD

The present invention relates to a character input device and a character input program, and more particularly to a character input device and a character input program that adopt a predictive conversion method.

BACKGROUND ART

A character input device and a character input program for use in a mobile information terminal such as a cellular telephone adopt a predictive conversion method in order to simplify text input manipulation.

In the predictive conversion method, a plurality of conversion candidates are presented according to an inputted character string. When any one conversion candidate is selected from a plurality of presented conversion candidates, the inputted character string is then replaced by the selected conversion candidate, or the selected conversion candidate is added subsequent to the inputted character string.

The conversion candidates include those prepared beforehand in the initial state and those later added using a learning functionality.

In addition, there are a device and a method in which, when a specific character string is inputted, an associated function is invoked, and the invoked function is used to generate a conversion candidate (for example, see Patent Document 1).

For an input device that handles numerical characters, there is a device that automatically performs currency conversion (for example, see Patent Document 2).

CITATION LIST

Patent Document

Patent Document 1: JP2006-127002A
Patent Document 2: JP2002-288495A

DISCLOSURE OF THE INVENTION

Problems to be Solved by the Invention

In the case where text includes a plurality of numeric values, one of the numeric values is often the result of a mathematical operation using the other numeric values. For example, in the case where text includes x yen, y yen, and z yen, the text sometimes expresses z yen=x yen+y yen. Thus, in a character input device adopting a predictive conversion method, it is convenient if the result of a specific mathematical operation is presented as a conversion candidate in the case where numeric values are inputted.

The character input device described in Patent Document 1 can generate a conversion candidate like "m month, n day" when a word "today", for example, is inputted using the function. However, this character input device can present only another character string as a conversion candidate to a specific character string. In other words, this character input device does not generate one conversion candidate based on two character strings (numeric values) or more.

In addition, although the device described in Patent Document 2 can easily perform currency conversion, the device is neither a character input device nor a device adopting a predictive conversion method, so that the device cannot present conversion candidates.

It is an object of the present invention to provide a character input device and a character input program that can perform a specific mathematical operation using inputted numeric values and present the result of the mathematical operation as a conversion candidate.

Solutions to the Problems

A character input device according to the present invention is a character input device adopting a predictive conversion method, the device including a conversion candidate generating section that performs a preset mathematical operation when a numeric value is inputted and displays a result of the mathematical operation as a conversion candidate.

A character input program according to the present invention causes a computer adopting a predictive conversion method to execute the step of generating a conversion candidate wherein a preset mathematical operation is performed when a numeric value is inputted and a result of the mathematical operation is displayed as a conversion candidate.

Effects of the Invention

According to the present invention, when a numeric value is inputted, a preset mathematical operation is performed, and the result of the mathematical operation is displayed as a conversion candidate, so that it is possible to facilitate the input of numeric values.

BEST MODE FOR CARRYING OUT THE INVENTION

In the following, embodiments of the present invention will be described in detail with reference to the drawings.

Figure 1:
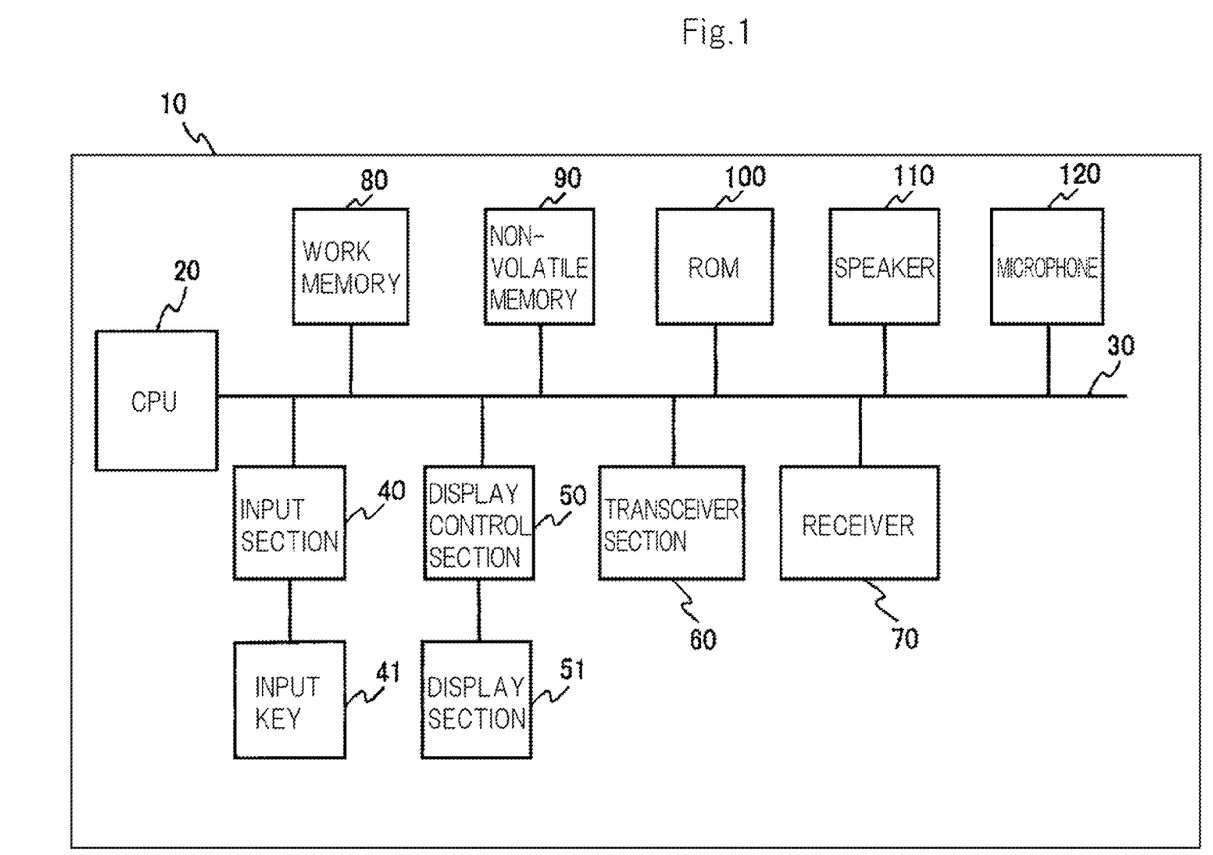
FIG. 1 is a block diagram illustrating the configuration of the essential part of a cellular telephone according to the first embodiment of the present invention.

FIG. 1 is a block diagram illustrating the configuration of the essential part of cellular telephone 10 that is a mobile information terminal according to a first embodiment of the present invention.

As shown in FIG. 1, cellular telephone 10 is mounted with CPU (Central Processing Unit) 20. CPU 20 is connected to input section 40, display control section 50, transceiver section 60, receiver 70, work memory 80, non-volatile memory 90, ROM 100, speaker 110, and microphone 120 through bus 30.

Input section 40 is a circuit that detects input from input key 41.

Display control section 50 is a control circuit that controls display of display section 51. Display section 51 is a display device that is provided on the front surface side of the main body of cellular telephone 10 and that has a monochrome or color liquid crystal panel, organic electroluminescent (electro-fluorescent) panel, or the like.

Transceiver section 60 is a circuit that makes incoming calls, outgoing calls, conversations, and communications through radio.

Receiver 70 is a device that outputs a correspondent's voice in conversations or the like.

Work memory 80 is configured of a RAM (Random Access Memory) and stores data that is temporarily necessary for CPU 20 to execute a program.

Non-volatile memory 90 is a semiconductor memory that can freely erase and write data and hold stored data after a power supply is turned off. Non-volatile memory 90 can hold user data such as telephone book data, a user dictionary, various set values, and messages.

ROM 100 is a read-only memory that stores fixed data such as various control programs executed by CPU 20.

Speaker 110 is a device that outputs ringtone melodies, voices, confirmation sounds, or the like.

Microphone 120 is a device that transmits voices.

The above-mentioned configuration is the same as the configuration of a typical cellular telephone. In the above-mentioned configuration, CPU 20, input section 40, input key 41, display control section 50, display section 51, work memory 80, non-volatile memory 90, and ROM 100 constitute a character input device.

A feature of cellular telephone 10 according to this embodiment is a program recorded in ROM 100, that is, a character input program for use in creating text such as messages, in particularly. Namely, a feature of cellular telephone 10 according to this embodiment is operations based on this character input program.

Figure 2:
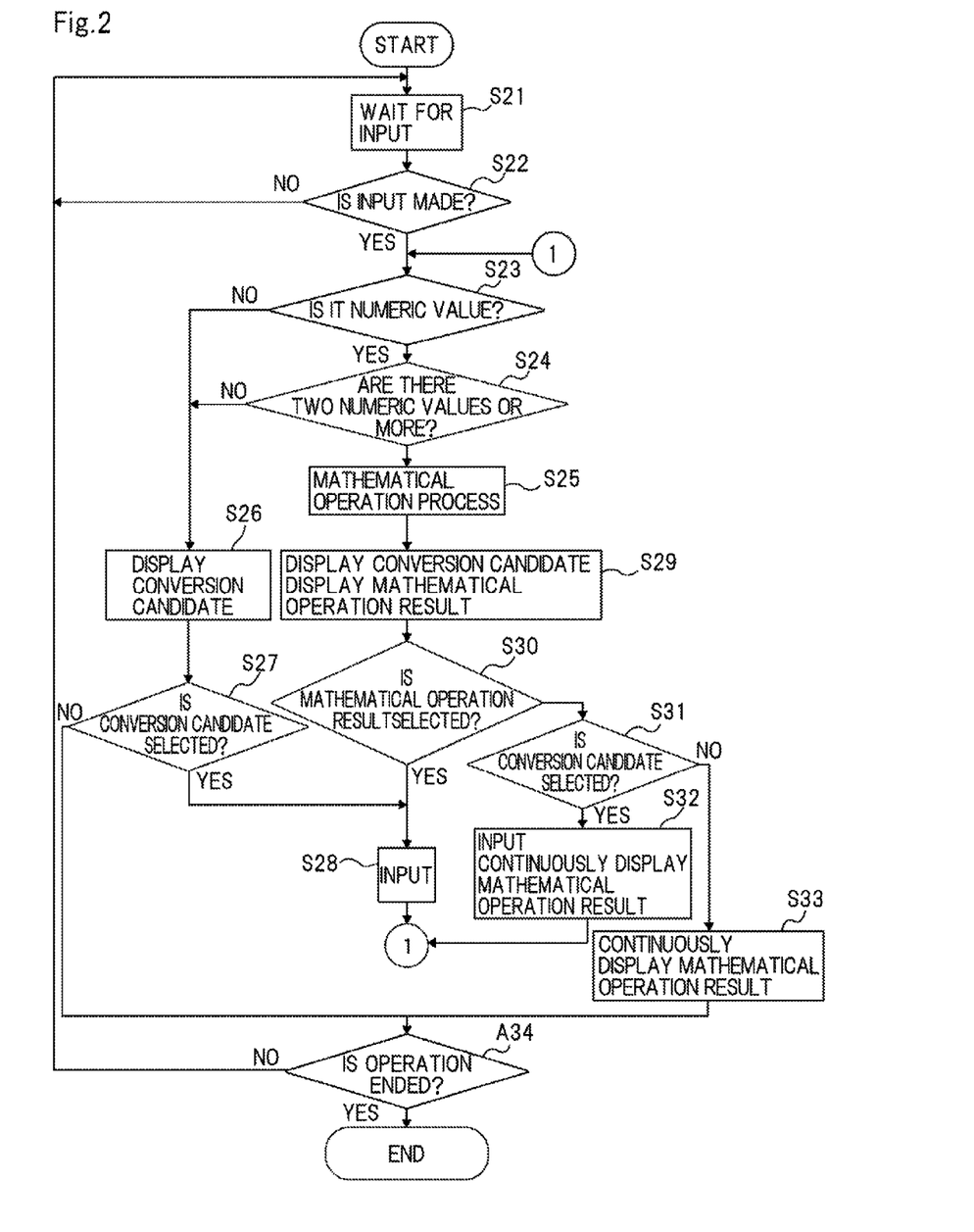
FIG. 2 is a flow chart illustrative of a character input operation of the cellular telephone shown in FIG. 1.

In the following, the operation of cellular telephone 10 will be described with reference to the flow chart shown in FIG. 2. In addition, the operation below is implemented by CPU 20 to execute the program stored in ROM 100. In this operation, CPU 20 functions as a conversion candidate generating section.

First, cellular telephone 10 waits for input from input key 41 (Steps S21 and S22). If input from input key 41 is detected (YES in Step S22), a determination is made whether the input is a "numeric value" input (Step S23). This determination is made depending on whether or not a character or symbol (a space or the like may be fine) is inputted after inputting one or more numerical characters. Thus, a similar process in the case of inputting a character or symbol (in the following, referred to as a normal process) is performed during the input of a numerical character (NO in Step S23).

If it is determined that "a numeric value" is inputted in Step S23, a determination is made whether there are two or more numeric values in text that is being currently created (in the following, referred to as a message body) (Step S24). Then, if there are two or more numeric values in the message body (YES in Step S24), a mathematical operation process is performed (Step S25).

If there are not two or more numeric values in the message body (NO in Step S24), the normal process is performed. Namely, conversion candidates are retrieved from a prediction dictionary or a user dictionary according to a character, symbol or the like inputted in the message body. When one or more of the conversion candidates are obtained as a search result, these conversion candidates are displayed on a part of the display screen of display section 51 (Step S26).

If a manipulation is made to select any one of the conversion candidates displayed on display section 51 (YES in Step S27), the selected conversion candidate is inputted to the message body (Step S28). The operation then returns to Step S23.

If none of the conversion candidates displayed on display section 51 is selected and manipulation is made to end the input operation, the operation is ended (YES in Step S34). If none of the conversion candidates displayed on display section 51 is selected and if no manipulation is made to end the input operation, cellular telephone 10 waits for the next input (NO in Step S34).

If it is determined that there are two or more numeric values in Step S24, the mathematical operation process is performed in Step S25 as described above.

For the mathematical operation process, although various mathematical operations are possible, the adding process (addition) is considered to be the most practical operation.

For a simple adding process, there is a process in which only numeric values are recognized as values that are to be added up together. This method has an advantage that the program is simple, on one hand, and has the disadvantage that numeric values that are not appropriate for targets of the mathematical operation process, including numeric values for the date and time, are added together, on the other hand. However, this process is effective for creating text that only includes numeric values that have the same unit.

As an adding process that is much more practical, there is a process in which a character or symbol that expresses the unit of a numeric value is recognized and in which only numeric values that have the same unit are summed together. The unit is generally positioned immediately before or immediately after numeric values, and units frequently used are limited. Thus, units can be easily detected. Units frequently used are "¥", "yen", "$", "person (measure word)", "calorie", "kilo", "Kcal", "piece (measure word)", "meter", "gram", and so on. These characters or symbols are recognized, and only numeric values that have the same unit are added together. In this case, in Step S24, a determination is made whether there are two or more numeric values in that have the same unit. It is noted that the number of detectable units is restricted to three units, "yen", "person", and "calorie", for example, so that it is possible to prevent the program from becoming complicated.

It is also possible to carry out a more complicated process; for example, the content of text is analyzed, and a mathematical operation suited for the content is performed. However, carrying out a complicated process leads to an increase in power consumption, which is not desirable for a mobile information terminal such as cellular telephone 10.

The result of the mathematical operation obtained from the mathematical operation process is displayed as one conversion candidate together with conversion candidates displayed on a part of the display screen of display section 51 according to the normal process (Step S29). It is noted that in FIG. 2, in order to distinguish between conversion candidates according to the normal process and a conversion candidate that is the result of the mathematical operation, the conversion candidate that is the result of the mathematical operation is represented as "the result of the mathematical operation" as it is. Also in the following explanation, the result of the mathematical operation is referred to as the result of the mathematical operation as is, and is not referred to as a conversion candidate.

Subsequently, if input key 41 is manipulated to select the result of the mathematical operation displayed on display section 51, the selected mathematical operation result is inputted to the message body (YES in Step S30 and Step S28). The operation then returns to Step S23.

On the other hand, if the result of the mathematical operation is not selected in Step S30 and if any one of the conversion candidates is selected (YES in Step S31), the selected conversion candidate is inputted to the message body. In this operation, although the conversion candidates are updated similar to the normal process, the result of the mathematical operation is continuously displayed as is (Step S32). The operation then returns to Step S23.

If either the result of the mathematical operation is not selected in Step S30 or if any one of the conversion candidates is not selected in Step S31 (NO in Step S31), the result of the mathematical operation is continuously displayed (Step S33), and processing is performed according to the next manipulation.

FIGS. 3A~3C and FIGS. 4A~4B show an exemplary change in the display content on display section 51 according to the aforementioned operation. Here, an example is shown in which the result of adding together numeric values that have the same unit is presented as a conversion candidate. In each of FIGS. 3A~3C and FIGS. 4A~4B, the middle part shows text (a message body) have just been inputted, and the lower part expresses conversion candidates.

Figure 3A:
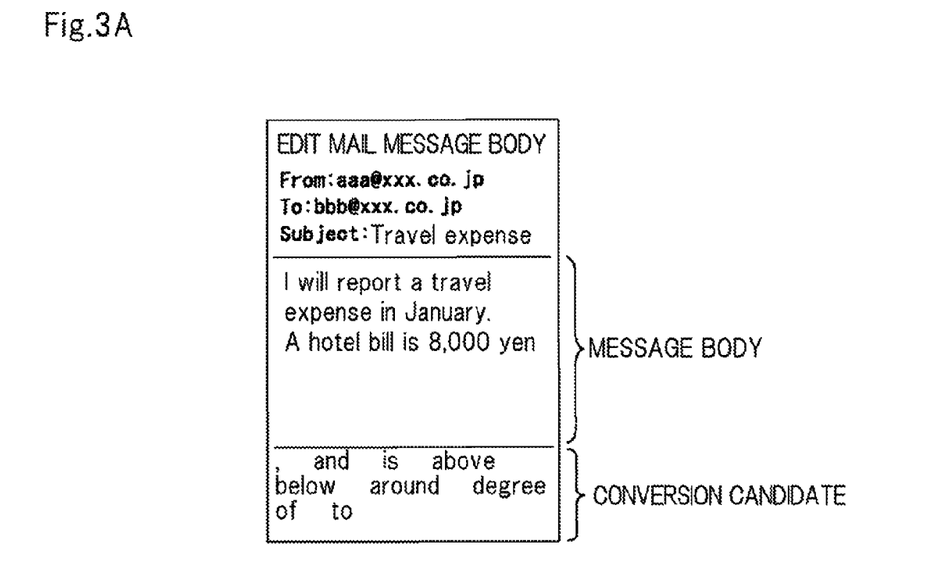
FIG. 3A is a diagram illustrating an exemplary display screen of a display section in the character input operation of the cellular telephone shown in FIG. 1.

FIG. 3A shows that "8,000 yen" has just been inputted to a message body. In this state, the message body includes two numeric values, "January" and "8,000 yen". However, since these numeric values each have different units, it is determined as NO in Step S24, and the normal process is performed (Step S26). It is noted that numerical characters that are immediately followed by "year", "month", and "day" may not be considered as "numeric values". On the other hand, if numerical characters that are immediately followed by "hour" and "minute" are treated as "numeric values", the present invention is useful for creating a written description for travel or the like that expresses hours.

Figure 3B:
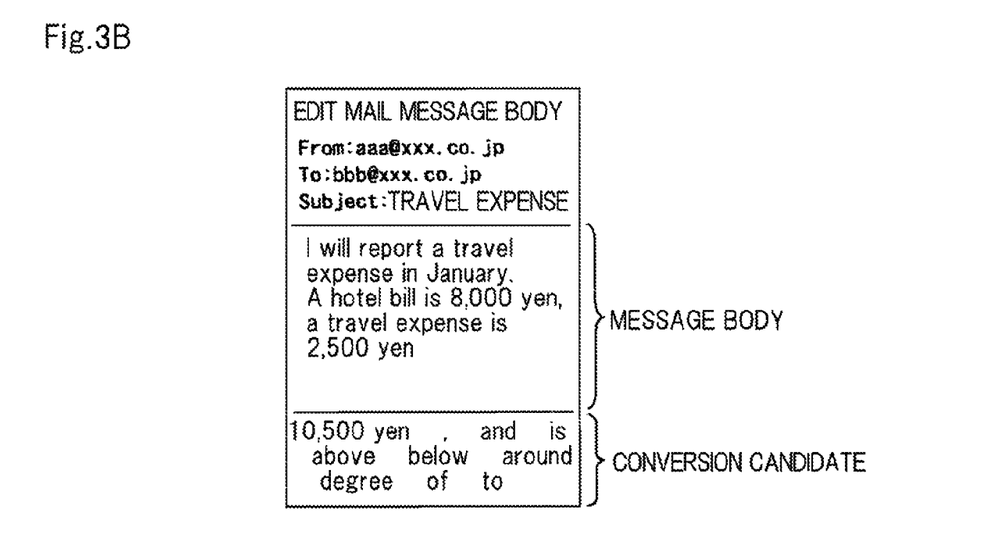
FIG. 3B is a diagram illustrating an exemplary display screen of the display section in the character input operation of the cellular telephone shown in FIG. 1.

FIG. 3B shows that "2,500 yen" is just inputted to the message body. At this time, it is determined that there are two or more numeric values that have the same unit in Step S24, a predetermined specific mathematical operation process, an adding process here, is performed (Step S25). As the result, "10,500 yen", which is the result of the mathematical operation (the sum total), is displayed on the lower part of display section 51 together with the other conversion candidates (Step S29). It is noted that although numeric values are displayed with the accompanying unit here, "10,500" without the unit may be possible. In this case, it is sufficient to present "yen" as a subsequent conversion candidate when "10,500" is selected.

Figure 3C:
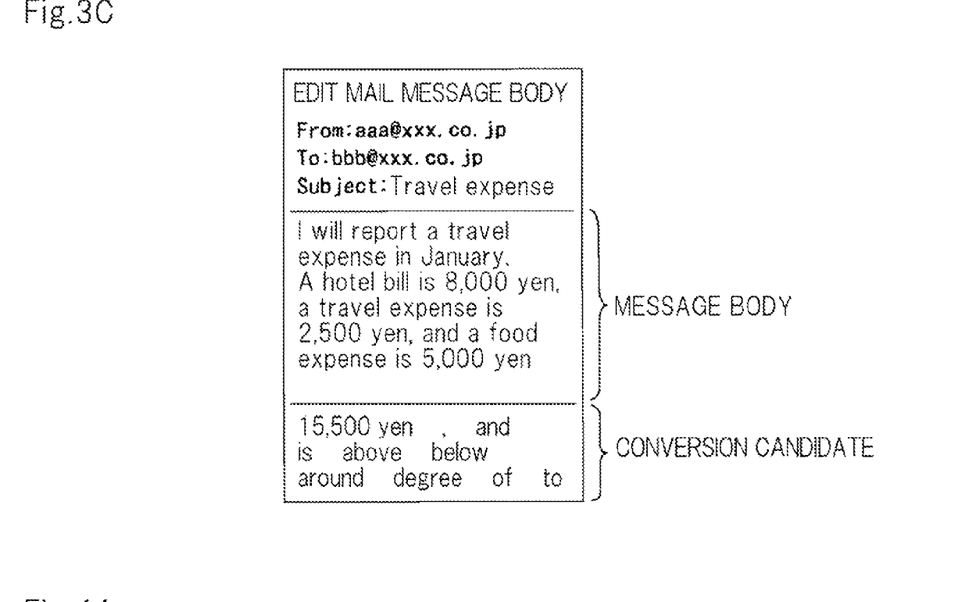
FIG. 3C is a diagram illustrating an exemplary display screen of the display section in the character input operation of the cellular telephone shown in FIG. 1.

FIG. 3C shows a state in which the result of the mathematical operation is not selected (NO in Step S30) and "5,000 yen" is then inputted in the state shown in FIG. 3B. Also at this time, the mathematical operation process is performed in Step S25, and "15,500 yen" is displayed as a new result of the mathematical operation (Step S29).

Figure 4A:
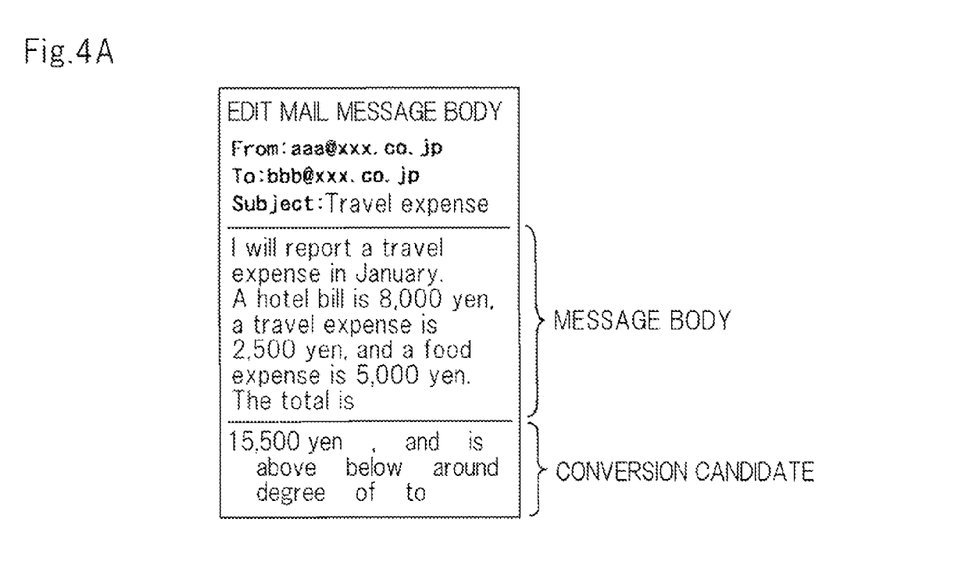
FIG. 4A is a diagram illustrating an exemplary display screen of the display section in the character input operation of the cellular telephone shown in FIG. 1.
Figure 4B:
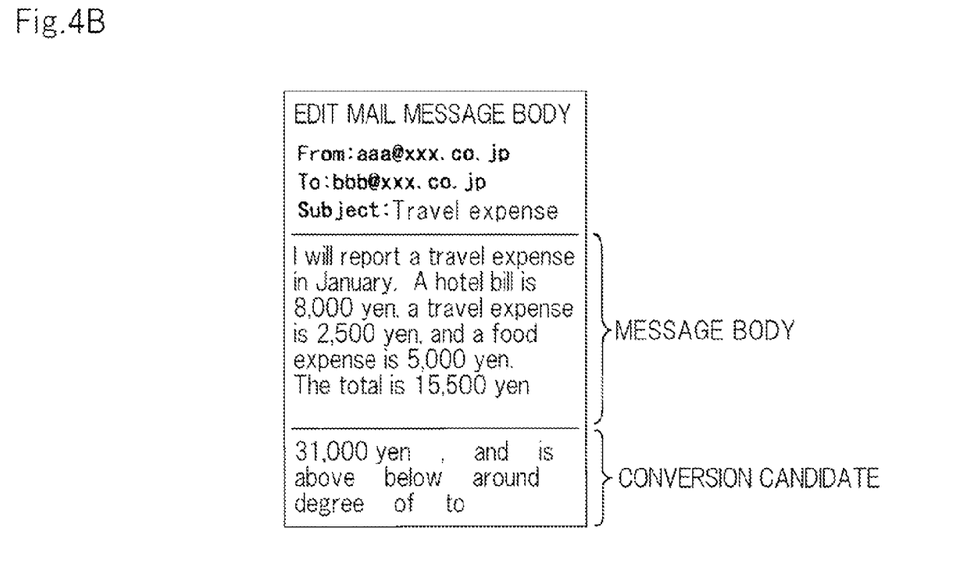
FIG. 4B is a diagram illustrating an exemplary display screen of the display section in the character input operation of the cellular telephone shown in FIG. 1.

If the result of the mathematical operation is also not selected in the state shown in FIG. 3C, the result of the mathematical operation will be continuously displayed (Step S32 or S33). FIG. 4A shows this state. If the result of the mathematical operation is selected in the state shown in FIG. 4A (YES in Step S27), the selected mathematical operation result will be inputted to the message body as shown in FIG. 4B.

As described above, in cellular telephone 10 according to this embodiment, the result of adding numeric values that have the same unit is displayed as one of the conversion candidates, so that it is possible to readily input a sum of money or the like.

Moreover, in cellular telephone 10 according to this embodiment, in the case where it is necessary to add numeric values together when inputting text, it is possible to readily and accurately input the result of addition without using an electronic calculator or an electronic calculator that is functionality incorporated in a mobile information terminal. In addition, since inputting characters also serves as a calculation process, it is possible to save time and effort to input numeric characters to an electronic calculator or the like for calculation.

Next, other embodiments of the present invention will be described.

Figure 5:
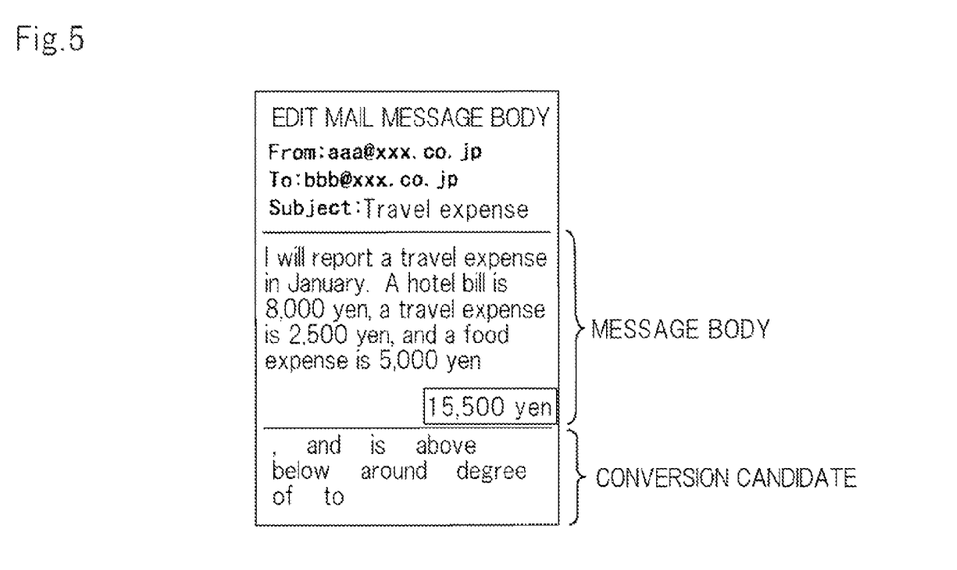
FIG. 5 is a diagram illustrating an exemplary display screen of a display section in a character input operation of a cellular telephone according to a second embodiment of the present invention.

FIG. 5 is a diagram illustrating a display screen of a cellular telephone according to a second embodiment of the present invention, showing a state corresponding to the state shown in FIG. 3C. As shown in FIG. 5, in this embodiment, the result of a mathematical operation is shown in an exclusive region different from the lower part of the display section. Features other than this are the same as those in the first embodiment.

Figure 6:
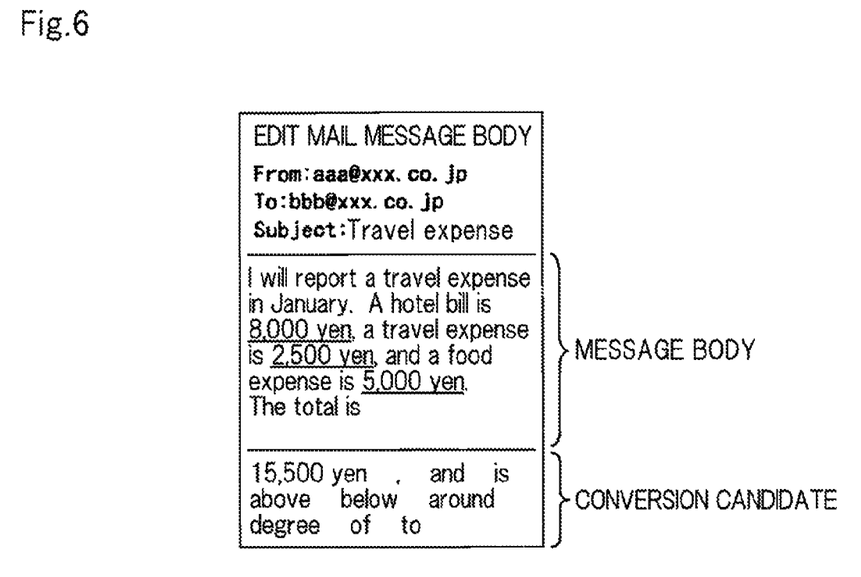
FIG. 6 is a diagram illustrating an exemplary display screen of a display section in a character input operation of a cellular telephone according to a third embodiment of the present invention.

FIG. 6 is a display screen of a cellular telephone according to a third embodiment of the present invention, showing a state corresponding to the state shown in FIG. 4A. As shown in FIG. 6, in this embodiment, numeric values and a unit that are targets for the result of the mathematical operation are underlined, which improves visibility and which clearly shows the numeric values on which the result of the mathematical operation is based. Features other than this are the same as those in the first embodiment.

Figure 7:
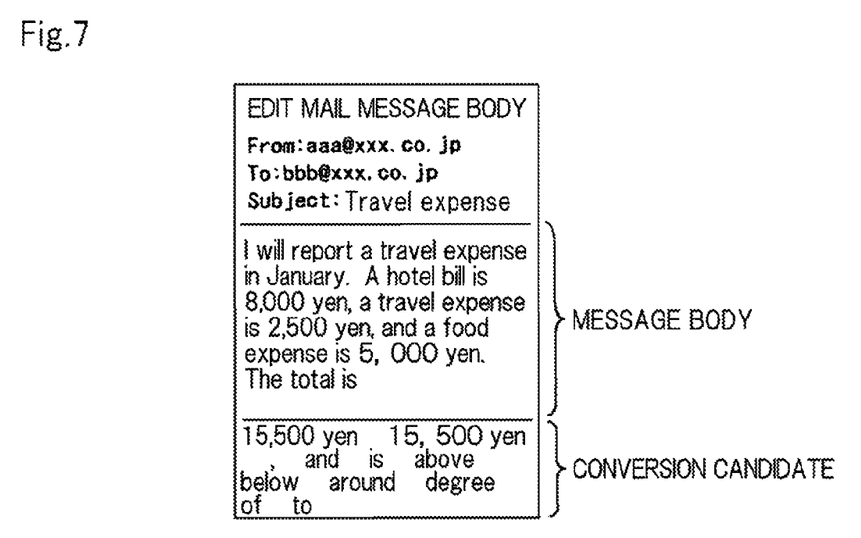
FIG. 7 is a diagram illustrating an exemplary display screen of a display section in a character input operation of a cellular telephone according to a fourth embodiment of the present invention.

FIG. 7 is a display screen of a cellular telephone according to a fourth embodiment of the present invention, showing a state corresponding to the state shown in FIG. 4B. As shown in FIG. 7, in this embodiment, the results of a mathematical operation in single-width and double-width character notations are displayed according to the notations of numeric values in a message body. Features other than this are the same as those in the first embodiment.

As described above, the present invention is explained based on the embodiments. However, the present invention is not limited to the aforementioned embodiments, which can be variously modified and altered without departing from the teachings of the present invention.

For example, in the aforementioned embodiments, the case is explained in which one flow chart implements the normal process and the process in which two or more numeric values are subjected to the mathematical operation, and the obtained result of the mathematical operation is displayed as one of the conversion candidates (referred to as a conversion candidate generation process by the mathematical operation). However, such a configuration is also possible such that the normal process is the main routine and the conversion candidate generation process by the mathematical operation is the subroutine. The conversion candidate generation process by the mathematical operation is configured as a subroutine, so that it is possible to perform a more complicated process by using a simple program.

Moreover, in the aforementioned embodiments, numeric values that have the same unit included in a message body are all added together to obtain the result of the mathematical operation. However, it is also possible that when the result of the mathematical operation is once selected and inputted to a message body, the previous numeric values are ignored and numeric values that have the same unit that are subsequently inputted are subjected to the mathematical operation process. With this configuration, it is possible to eliminate the indication of "31,000 yen" in the state shown in FIG. 4B.

Furthermore, in the aforementioned embodiments, a determination is made whether there are two or more numeric values and then the mathematical operation process is performed. However, it is also possible that the result of the mathematical operation is stored for each unit and added to the corresponding result of the mathematical operation each time that a numeric value is detected. With this configuration, it is possible to handle the input of a new subsequent numeric value just by clearing the stored results of the mathematical operation when the result of the mathematical operation is once selected and inputted.

In addition, in the aforementioned embodiments, the case of the cellular telephone as a mobile information terminal is explained. However, it is possible to apply the present invention to other mobile information terminals, such as a PHS (Personal Handyphone System) and a PDA (Personal Data Assistance or Personal Digital Assistants), for example, Moreover, in the aforementioned embodiments, the case is explained where numeric values are positive integers. However, numeric values may be decimal fractions or negative numbers.

Figure 8:
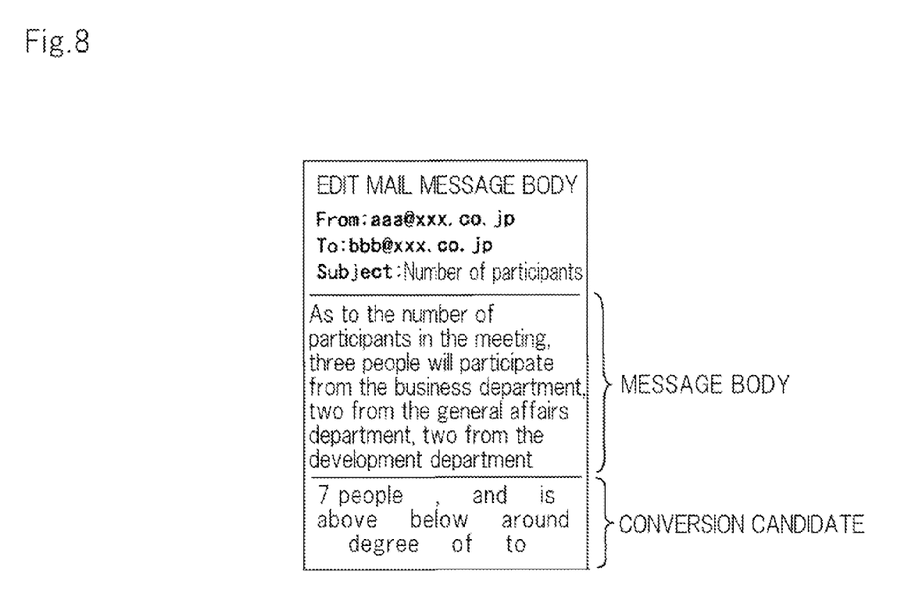
FIG. 8 is a diagram illustrating an exemplary display screen of a display section in a character input operation of a cellular telephone according to another embodiment of the present invention.

Furthermore, in the aforementioned embodiments, the case is explained where the unit is "yen". However, as described above, it is also possible to subject numeric values in other units or numeric values that are not in any unit to the mathematical operation process. FIG. 8 shows an exemplary display in the case where the unit is "person". In addition, two units or more may be each subjected to the conversion candidate generation process by the mathematical operation.

Moreover, in the aforementioned embodiments, the case is assumed where a message body is inputted. However, it is possible to apply the present invention to applications using the functionality of the character input device such as a notepad, scheduler or the like of a mobile information terminal, for example.

Furthermore, in the aforementioned embodiments, an example is explained in which the result of the mathematical operation is continuously displayed. However, it is also possible that the result of the mathematical operation is displayed as a conversion candidate when specific characters, such as "sum total" or "total," for example, are inputted, in which the result of the mathematical operation is not displayed while the mathematical operation is being performed.

In addition, it is also possible that a currently inputted unit is presented as a conversion candidate when numerical characters which are not accompanied by any unit are inputted. For example, in the case where a title includes "calorie intake" and a message body includes "coffee 200, cake 400" in creating a message or a schedule, it is also possible that "600" is displayed as the result of the mathematical operation and "Kcal" and/or "calories" is displayed as a conversion candidate. Alternatively, it is also possible that "600" is displayed as the result of the mathematical operation and "600 Kcal" and/or "600 calories" is displayed as a conversion candidate The present application claims the benefit of priority on the basis of Japanese Patent Application No. 2009-168944 filed on Jul. 17, 2009, the entire disclosure of which is incorporated herein.

The invention claimed is:

1. A character input device adopting a predictive conversion method, the device comprising:
    a conversion candidate generating section that detects two or more numeric values in text being inputted,
    wherein the conversion candidate generating section performs a preset mathematical operation in response to the two or more numeric values in text being inputted, and
    wherein the conversion candidate generating section displays a result of the mathematical operation as a conversion candidate.

2. The character input device according to claim 1, wherein the result of the mathematical operation displayed as the conversion candidate is continuously displayed until the result of the mathematical operation displayed as the conversion candidate is selected.

3. The character input device according to claim 1, wherein the preset mathematical operation is addition.

4. The character input device according to claim 3, wherein the conversion candidate generating section identifies a character expressing a unit to be inputted subsequent to the numeric value and adds a numeric value that have the same unit.

5. The character input device according to claim 3, wherein the conversion candidate generating section identifies a character string expressing a unit, and displays the result of the mathematical operation and a combination of the result of the mathematical operation and the character string expressing the unit as the conversion candidates.

6. A mobile information terminal comprising the character input device according to claim 1.

* * * * *